(12) United States Patent
Pugsley et al.

(10) Patent No.: US 9,286,224 B2
(45) Date of Patent: Mar. 15, 2016

(54) CONSTRAINING PREFETCH REQUESTS TO A PROCESSOR SOCKET

(71) Applicant: Intel Corporation, Santa Clara, CA (US)

(72) Inventors: Seth H. Pugsley, Salt Lake City, UT (US); Robert L. Scott, Gilbert, AZ (US); Zeshan A. Chishti, Hillsboro, OR (US); Peng-Fei Chuang, Santa Clara, CA (US); Khun Ban, Hillsboro, OR (US); Christopher B. Wilkerson, Portland, OR (US); Shih-Lien L. Lu, Portland, OR (US); Kingsum Chow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 14/090,056

(22) Filed: Nov. 26, 2013

(65) Prior Publication Data

US 2015/0149714 A1    May 28, 2015

(51) Int. Cl.
*G06F 12/08*    (2006.01)
*G06F 9/45*    (2006.01)

(52) U.S. Cl.
CPC ........ *G06F 12/0862* (2013.01); *G06F 12/0811* (2013.01); *G06F 8/4442* (2013.01); *G06F 2212/602* (2013.01)

(58) Field of Classification Search
CPC    G06F 12/0862; G06F 12/0811; G06F 8/4442
USPC ................................... 711/119, 137
See application file for complete search history.

(56) References Cited

U.S. PATENT DOCUMENTS

| 7,809,903 | B2 | 10/2010 | Adl-tabatabai et al. | |
| 2008/0209173 | A1* | 8/2008 | Evers et al. ................ | 712/207 |
| 2011/0040941 | A1* | 2/2011 | Diefendorff ............... | 711/137 |
| 2011/0289380 | A1 | 11/2011 | Wilkerson et al. | |
| 2014/0156932 | A1* | 6/2014 | Dundas ...................... | 711/122 |

OTHER PUBLICATIONS

U.S. Appl. No. 13/715,613, filed Dec. 14, 2012.

\* cited by examiner

*Primary Examiner* — Than Nguyen
(74) *Attorney, Agent, or Firm* — Trop, Pruner & Hu, P.C.

(57) ABSTRACT

In an embodiment, a processor includes at least one core having one or more execution units, a first cache memory and a first cache control logic. The first cache control logic may be configured to generate a first prefetch request to prefetch first data, where this request is to be aborted if the first data is not present in a second cache memory coupled to the first cache memory. Other embodiments are described and claimed.

22 Claims, 8 Drawing Sheets

CONSTRAINING PREFETCH REQUESTS TO A PROCESSOR SOCKET

BACKGROUND

Many processors implement prefetching, which aims to bring data that will be used in the near future into a processor's cache memory system before it is actually needed. This reduces stalls in the processor's pipeline waiting for data from memory to be available. By bringing the data closer to the processor's core, prefetching can reduce average memory access latency, and improve cache hit rates. However, it is difficult to know ahead of time what information will be useful to prefetch. If inefficiently applied, prefetching can consume memory bandwidth and cache resources by prefetching data that is never used.

Conventional prefetch mechanisms typically issue prefetch requests as low priority demand requests which are processed by all levels of the cache hierarchy. These requests result in a main memory transaction if the data is not present in the cache system.

DETAILED DESCRIPTION

Figure 1:
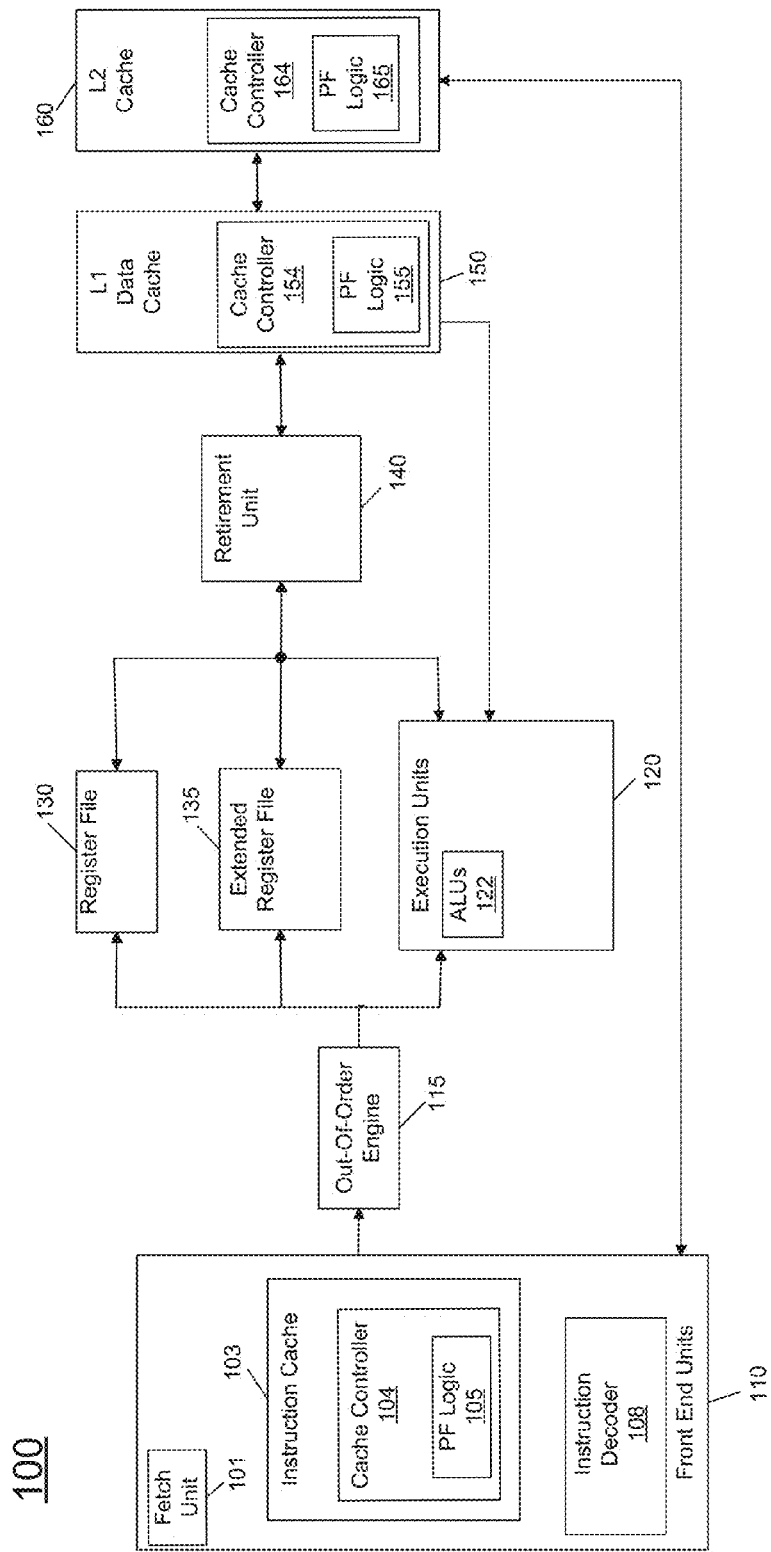
FIG. 1 is a block diagram of a processor core in accordance with one embodiment of the present invention.

In various embodiments, a defeasible prefetch request can be generated within a cache memory hierarchy and handled in a manner to reduce its impact on system resources. More specifically, embodiments provide a so-called limited or light prefetch technique in which a prefetch request is generated and provided to limited portions of a memory hierarchy to enable prefetching of requested information, if the information is present in the limited portions of the memory hierarchy to which the request is directed. If not, the request is squashed or aborted and additional resources, both within a processor and a system are not impacted by further handling such limited prefetch requests.

In some embodiments, a limited prefetch is generated by the same entity that generates conventional prefetch requests. However, limited prefetch requests may be indicated as such so that they are differently handled within the memory hierarchy. In many embodiments, such limited prefetch requests are only validly handled in a single level of a cache memory hierarchy such that if the requested data is present in that level of the cache memory hierarchy, the requested data is returned to the requester. Otherwise, the request is simply dropped. In other implementations, a limited prefetch request may be allowed to span multiple cache memory levels. However, in typical embodiments all such limited prefetch requests are limited to handling within a processor socket such that if the requested information is not present in the processor socket (e.g., at least within a highest level cache memory) the request is dropped, rather than incurring the memory bandwidth for communicating the request to a system memory.

Using light prefetching in accordance with an embodiment of the present invention, a prefetch request may be made for more speculative situations where there is less confidence that the requested information will actually be used by the processor responsive to a later demand request. Accordingly, embodiments may provide a hierarchy of prefetch requests such that conventional prefetch requests may be generated for addresses that are very likely to later be used, while limited prefetch requests may be generated for addresses that are more speculative and less likely to actually be used. For example based on the confidence regarding a result of a calculation made to generate a prefetch request, the request may be made as a conventional prefetch request or a limited prefetch request. In one such embodiment, the result may be compared to a threshold (or other confidence metric), and if greater than the threshold, the request may be made as a conventional prefetch, and instead if less than the threshold the request may be made as a limited prefetch.

Furthermore, control logic within levels of a cache memory hierarchy may be configured to handle the incoming light prefetch requests such that these entities operate to squash these requests if the associated cache memory does not have the requested data. Accordingly, a light prefetch request corresponds to a defeasible prefetch request that is either handled within a limited and confined portion of a memory hierarchy or is squashed. To identify prefetch requests as being of a conventional or a limited prefetch variant, one or more fields may be associated with these requests to enable various entities including cache control logic of the various cache memories to appropriately handle incoming requests.

Referring now to FIG. 1, shown is a block diagram of a processor core in accordance with one embodiment of the present invention. As shown in FIG. 1, processor core 100 may be a multi-stage pipelined out-of-order processor. Core 100 may support one or more instructions sets (e.g., the x86 instruction set (with some extensions that have been added with newer versions); the MIPS instruction set of MIPS Technologies of Sunnyvale, Calif.; or the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 100 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies.

As seen in FIG. 1, core 100 includes front end units 110, which may be used to fetch instructions to be executed and prepare them for use later in the processor. For example, front end units 110 may include a fetch unit 101, an instruction cache 103 (e.g., an L1 instruction cache), and an instruction decoder 105. In some implementations, front end units 110 may further include a trace cache, along with microcode storage as well as a micro-operation storage. Fetch unit 101 may fetch macro-instructions, e.g., from memory or instruction cache 103, and feed them to instruction decoder 105 to decode them into primitives, i.e., micro-operations for execution by the processor.

As seen, cache memory 103 includes a cache controller 104 having prefetch logic 105. Although shown as part of the cache controller, understand that this prefetch logic may be separate from the cache controller in other embodiments. As described further herein, prefetch logic 105 may be configured to generate conventional prefetch requests, e.g., based on next line prefetching or streaming prefetching. Furthermore, prefetch logic 105 also may be configured to generate limited prefetch requests. As an example, such limited prefetch requests may be generated when limited information is available for generating a prefetch prediction such that there is relatively low confidence of the eventual utility (reflected by a later demand request for the data).

Coupled between front end units 110 and execution units 120 is an out-of-order (OOO) engine 115 that may be used to receive the micro-instructions and prepare them for execution. More specifically OOO engine 115 may include various buffers to re-order micro-instruction flow and allocate various resources needed for execution, as well as to provide renaming of logical registers onto storage locations within various register files such as register file 130 and extended register file 135. Register file 130 may include separate register files for integer and floating point operations. Extended register file 135 may provide storage for vector-sized units, e.g., 256 or 512 bits per register.

Various resources may be present in execution units 120, including, for example, various integer, floating point, and single instruction multiple data (SIMD) logic units, among other specialized hardware. For example, such execution units may include one or more arithmetic logic units (ALUs) 122, among other such execution units.

Results from the execution units may be provided to a retirement unit 140 including a reorder buffer (ROB). This ROB may include various arrays and logic to receive information associated with instructions that are executed. This information is then examined by retirement unit 140 to determine whether the instructions can be validly retired and result data committed to the architectural state of the processor, or whether one or more exceptions occurred that prevent a proper retirement of the instructions. Of course, retirement unit 140 may handle other operations associated with retirement.

As shown in FIG. 1, retirement unit 140 is coupled to a cache 150 which in one embodiment may be a low level cache (e.g., an L1 data cache), although the scope of the present invention is not limited in this regard. As further seen in FIG. 1, cache memory 150 includes a cache controller 154 that in turn includes a prefetch logic 155. As with the prefetch logic described above, prefetch logic 155 may be configured to generate both conventional prefetch requests and limited prefetch requests as described herein. Furthermore, understand that while a single prefetch logic is shown, it is possible in some embodiments for multiple hardware prefetchers to be provided, at least one of which is to be used for purposes of conventional prefetch request generation and another hardware prefetcher to be used for purposes of limited prefetch request generation. Note that both prefetch logic 105 and prefetch logic 155 may generate such requests for delivery to a next level cache, namely cache 160, which in the embodiment shown is an L2 cache.

Also, execution units 120 can be directly coupled to cache 150. From cache 150, data communication may occur with next level cache 160. As with the L1 caches, cache 160 includes a cache controller 164 and an included prefetch logic 165. Understand also that prefetch logic 165 may generate both conventional prefetch requests and limited prefetch requests. Understand that such requests as well as additional memory communication traffic may occur between cache 160 and higher level caches (and a system memory for other memory requests and conventional prefetch requests, but not for limited prefetch requests).

While shown with this high level in the embodiment of FIG. 1, understand the scope of the present invention is not limited in this regard. For example, while the implementation of FIG. 1 is with regard to an out-of-order machine such as of an ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Embodiments that implement light prefetching transactions thus seek to promote data already present in a cache memory hierarchy (e.g., from a next level cache memory) in anticipation of its use by an instruction sequence. Because the prefetch does not extend beyond the processor socket, it does not generate external memory accesses and can reduce bandwidth and power consumption. Note that cache lines to be promoted by such light prefetching can be determined using calculations similar to existing prefetch mechanisms (e.g., adjacent or stride) and may involve either single or multiple cache lines.

In different embodiments, independent prefetch logic may be located in the various cache memories to issue limited prefetch requests to a next higher cache level (e.g., at the L2/L3 boundary and/or at the L1/L2 boundary). Note that it is possible for multiple light prefetch mechanisms to operate between each level of the cache hierarchy concurrently.

Using limited prefetching, data that is already within a processor socket may be promoted, which brings the requested data closer to the core where it can be accessed quicker and provide a performance improvement. Note that this in-socket data was previously fetched by either a non-speculative demand access responsive to a LLC miss or by a conventional prefetcher operating in parallel. As such, this data may have been useful in the past, and so has a greater likelihood of being useful again in the future (e.g., when a working set fits in the LLC).

Using embodiments of the present invention, limited prefetching does not incur memory traffic since if the prefetch cannot be serviced by the LLC (at a highest level), it is aborted. As such, prefetching as described herein can prevent extra power consumption due to prefetching activities, and may be especially useful in mobile platforms or other power constrained environments.

In some embodiments, performance may be highest when implementing a combination of conventional (e.g., streaming or next line prefetching) and light prefetching, while consuming only a moderate amount of memory bandwidth. By promoting data already within the cache hierarchy, light prefetching provides additional performance benefits when used in conjunction with conventional prefetch mechanisms.

Figure 2:
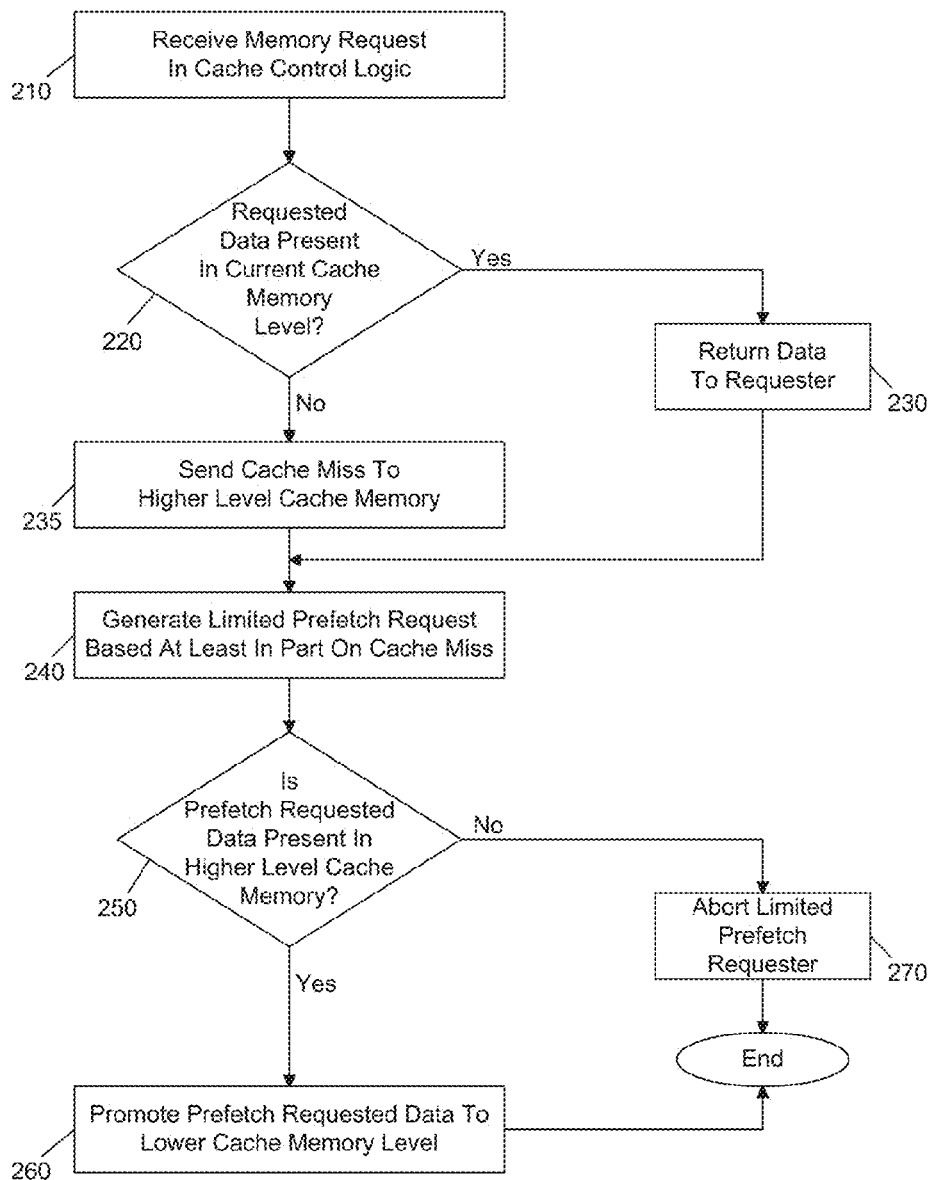
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 may be performed using cache control logic of multiple levels of a cache memory hierarchy. More specifically, prefetch logic either within the cache controller or coupled thereto may be leveraged in performing method 200.

As seen, method 200 begins by receiving a memory request in cache control logic (block 210). For example, assume that this memory request is received in a L1 cache memory. Responsive to this request, it is determined whether the data requested is present in the current cache memory level (diamond 220). For example, based on address information associated with the memory request, the cache controller may access a tag array of the cache memory to determine whether an address corresponding to the requested address is present in the cache memory. If so, control passes to block 230 where the requested data is returned to the requester.

Otherwise, a cache miss occurs and accordingly control passes to block 235 where a cache miss is sent to a higher level cache memory. In this example of an L1 cache memory miss, the memory request may be sent as a cache miss to an L2 cache memory. Of course understand that variations in the available levels of cache memory exist in different embodiments. As used herein, understand that the term "higher level cache memory" is intended to mean a cache memory that is further removed from a processor core, and typically corresponds to a more distant and larger cache memory. For example, an L2 cache memory is typically further away from a processor core pipeline and is larger than an L1 cache memory. In turn, an L3 or LLC is typically arranged outside of a core and is larger than the L1 or L2 cache memory.

Still referring to FIG. 2, from both of blocks 230 and 235, control passes to block 240. There, a limited prefetch request may be generated based at least in part on the cache miss. More specifically, a limited prefetch request can be generated using information associated with the memory request received in block 210. For example, different types of prefetching may occur, e.g., based on configuration of the prefetcher. For example, the prefetching may be a next line prefetching, a streaming prefetching or another type of prefetching.

Note that this limited prefetch request may be distinguished from a conventional prefetch request, e.g., by a limited prefetch indicator associated with the prefetch request. In an implementation in which memory requests are either demand-based or prefetch-based, a multi-bit field may be used to indicate the type of request, with a first indicator of a first state or value (e.g., a logic one) to indicate a demand request (and of a second state, e.g., a logic zero to indicate a prefetch request) and a second indicator to indicate a type of prefetch request, with a first state indicating a conventional prefetch request and a second state indicating a limited prefetch request. Of course, understand that different fields or indicators to identify the different types of access requests may be present in other embodiments. As will be described further herein, different handling of the different types of prefetch requests occurs within the cache memory hierarchy.

Control next passes to a determination at diamond 250, which may occur in a next level cache memory, namely a next higher level cache memory. At diamond 250, it is determined whether the prefetch requested data is present in this higher level cache memory. This determination may be as above, where an address portion of the request is compared against information in a tag array of the cache memory. If the requested data is present, control passes to block 260 where the prefetch requested data is provided to the next lower cache memory level. In the context of this example, this hit in the L2 cache memory causes the requested data to be provided to the L1 cache memory, and the data also may be maintained in the L2 cache memory (unless an exclusive cache memory system is implemented). As seen, method 200 thus concludes with the return or promotion of the requested data to the lower level cache memory.

Instead if it is determined at diamond 250 that requested prefetch data is not present in this level of cache memory, no further processing occurs and the limited prefetch request is aborted (block 270). That is, because the limited prefetch request may have been generated for a prefetch of lower confidence, the additional processing and bandwidth and power consumption that would be involved in traversing additional levels of a cache memory and then onto a system memory are prevented. Although shown at this high level in the embodiment of FIG. 2, understand the scope of the present invention is not limited in this regard.

Figure 3:
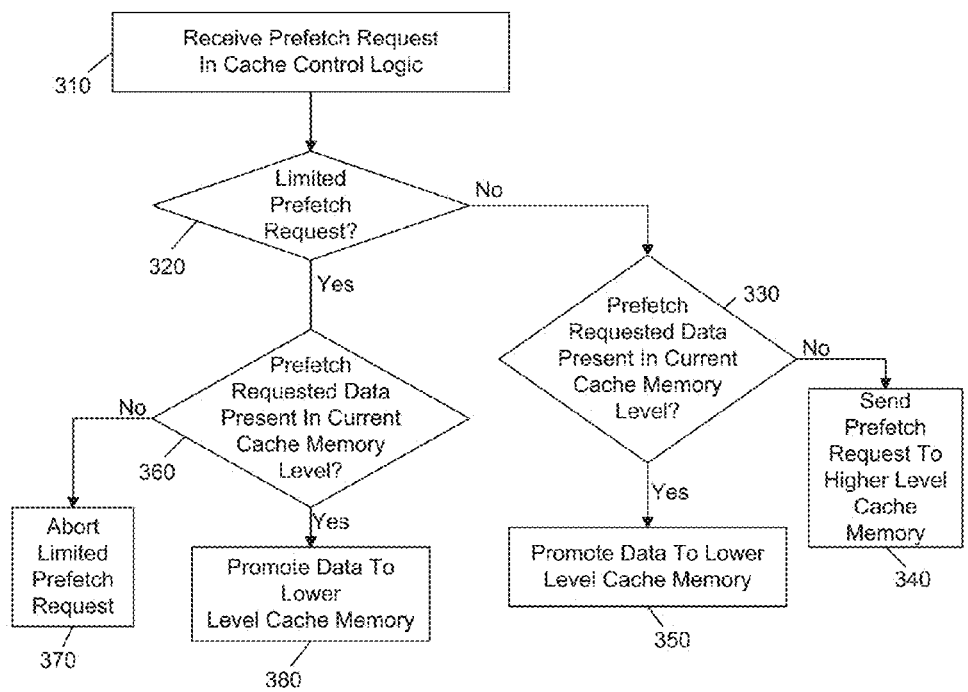
FIG. 3 is a flow diagram of a method in accordance with another embodiment of the present invention.

Referring now to FIG. 3 shown is a flow diagram of a method in accordance with another embodiment of the present invention. More specifically, method 300 of FIG. 3 details handling performed by a cache controller upon receipt of a prefetch request. Thus as seen, method 300 begins by receiving a prefetch request in a cache control logic (block 310). In an embodiment, a prefetch request may be distinguished from a demand request by way of an indicator as described above. Next it can be determined whether this prefetch request is a limited prefetch request (diamond 320). Again, this can be determined based on an indicator to identify the prefetch request as either a conventional prefetch request or a limited prefetch request.

If the request is identified as a conventional prefetch request, control passes to diamond 330. There, a determination may be made as to whether the prefetch requested data is present in the current level of cache memory. This determination may be based on comparison of address information of the prefetch request to information in a tag array. If a hit occurs, control passes to block 350 where the data present in the cache for this prefetch request is promoted to a next lower level cache memory. Otherwise if a miss occurs, control passes to block 340 where the prefetch request may be sent to a next higher level cache memory. For example, assume that the prefetch request is received in a L2 cache memory, and that the data is not present in this cache memory. For a conventional prefetch request, the request can be forwarded along to an LLC, in an embodiment. Further, although not shown in FIG. 3, for a conventional prefetch request if the requested data is not present in the LLC, the request may be forwarded along, e.g., via a memory controller, to a system memory to obtain the prefetch requested data.

Still referring to FIG. 3, instead if the prefetch request is identified as a limited prefetch request (as determined at diamond 320), control passes to diamond 360. There it can be determined whether the prefetch requested data is present in the current level of cache memory. If the request misses in this cache memory, control passes to block 370 where the limited prefetch request is thus aborted, as given the potentially greater speculative nature of this prefetch request (as compared to a conventional prefetch request), the consumption of bandwidth and power for further processing this limited prefetch request may not be warranted. And accordingly, the prefetch request is terminated. In some embodiments, optional signaling may occur from this current cache level back to a lower cache level to indicate that the limited prefetch request has been aborted. Instead if a hit occurs in the current cache level, control passes to block 380 where the data present in the cache for this prefetch request is promoted to a next lower level cache memory. Although shown at this high level in the embodiment of FIG. 3, understand the scope of the present invention is not limited in this regard.

Although the following embodiments with regard to prefetch operations enable energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the adaptive prefetch control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 4:
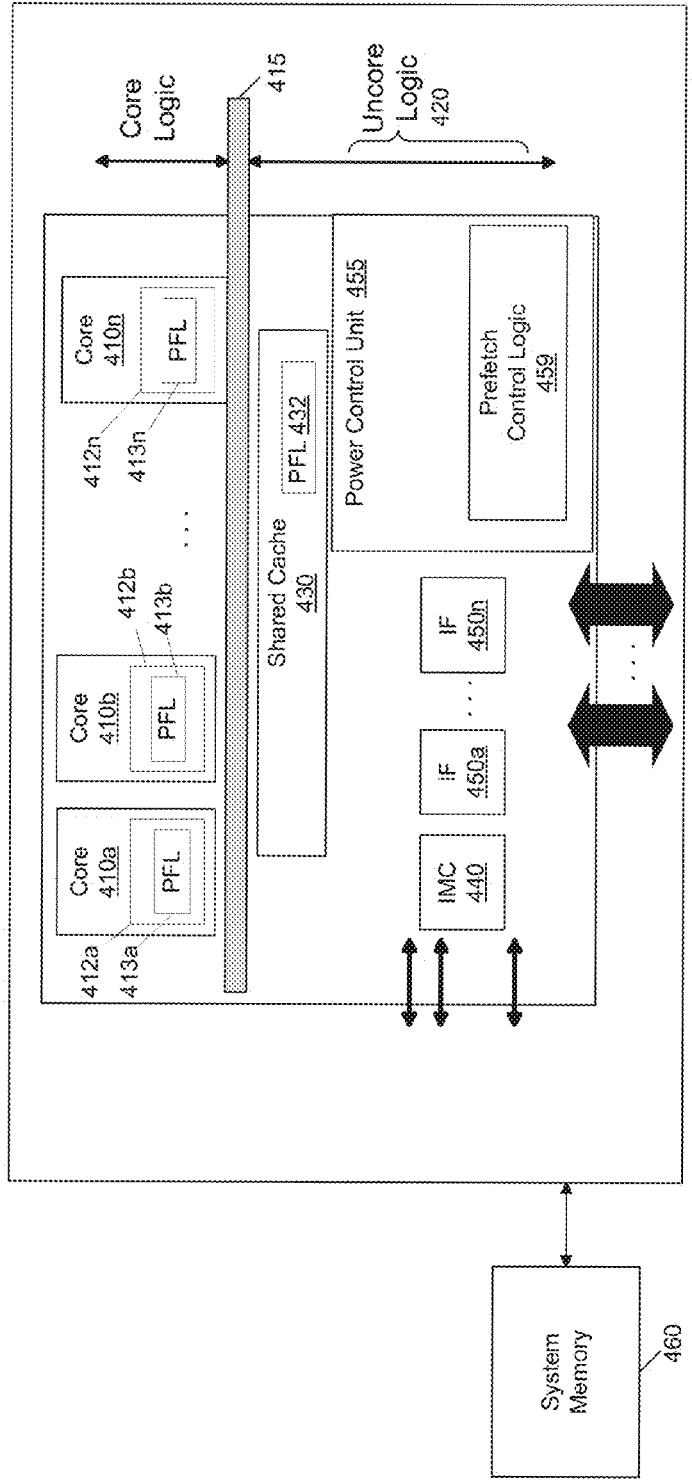
FIG. 4 is a block diagram of a processor in accordance with an embodiment of the present invention.

Embodiments can be implemented in processors for various markets including server processors, desktop processors, mobile processors and so forth. Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be of an independent power domain and can be configured to enter and exit active states and/or maximum performance states based on workload. Each core 410 includes a cache memory 412 having a corresponding prefetch logic 413 as described herein to enable both conventional and limited prefetch requests to be generated and handled. The various cores may be coupled via an interconnect 415 to a system agent or uncore 420 that includes various components. As seen, the uncore 420 may include a shared cache 430 which may be a last level cache, and which includes a prefetch logic 432 in accordance with an embodiment. In addition, the uncore may include an integrated memory controller 440, various interfaces 450 and a power control unit 455. In various embodiments, power control unit 455 may include a prefetch control logic 459 in accordance with an embodiment of the present invention. Using this logic, adaptive control of the prefetch logics is to controllably enable limited prefetch operations, e.g., based on memory bandwidth, power consumption levels, or other parameters. For example, when memory traffic is above a threshold or based on a processor configuration for power savings, light prefetching may be enabled. In other embodiments, a system may be configured, e.g., by system software, to be enabled to perform light prefetching in addition to conventional prefetching.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
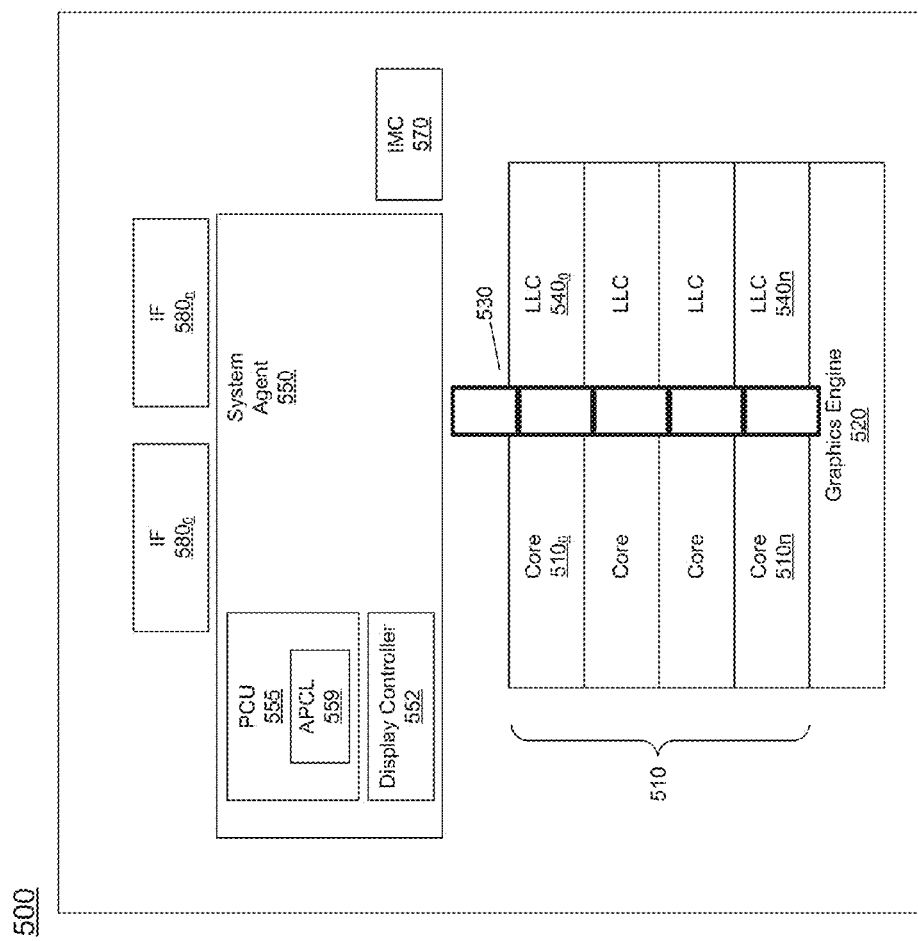
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches (with included prefetch logic as described herein) in addition to various execution units and additional processing elements. In turn, the various cores may be coupled to each other and to a shared cache memory formed of a plurality of units of a last level cache (LLC) $540_0$-$540_n$ (also including prefetch logic). In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an adaptive prefetch control logic 559 in accordance with an embodiment of the present invention to dynamically control enablement of a limited prefetch technique as described herein.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
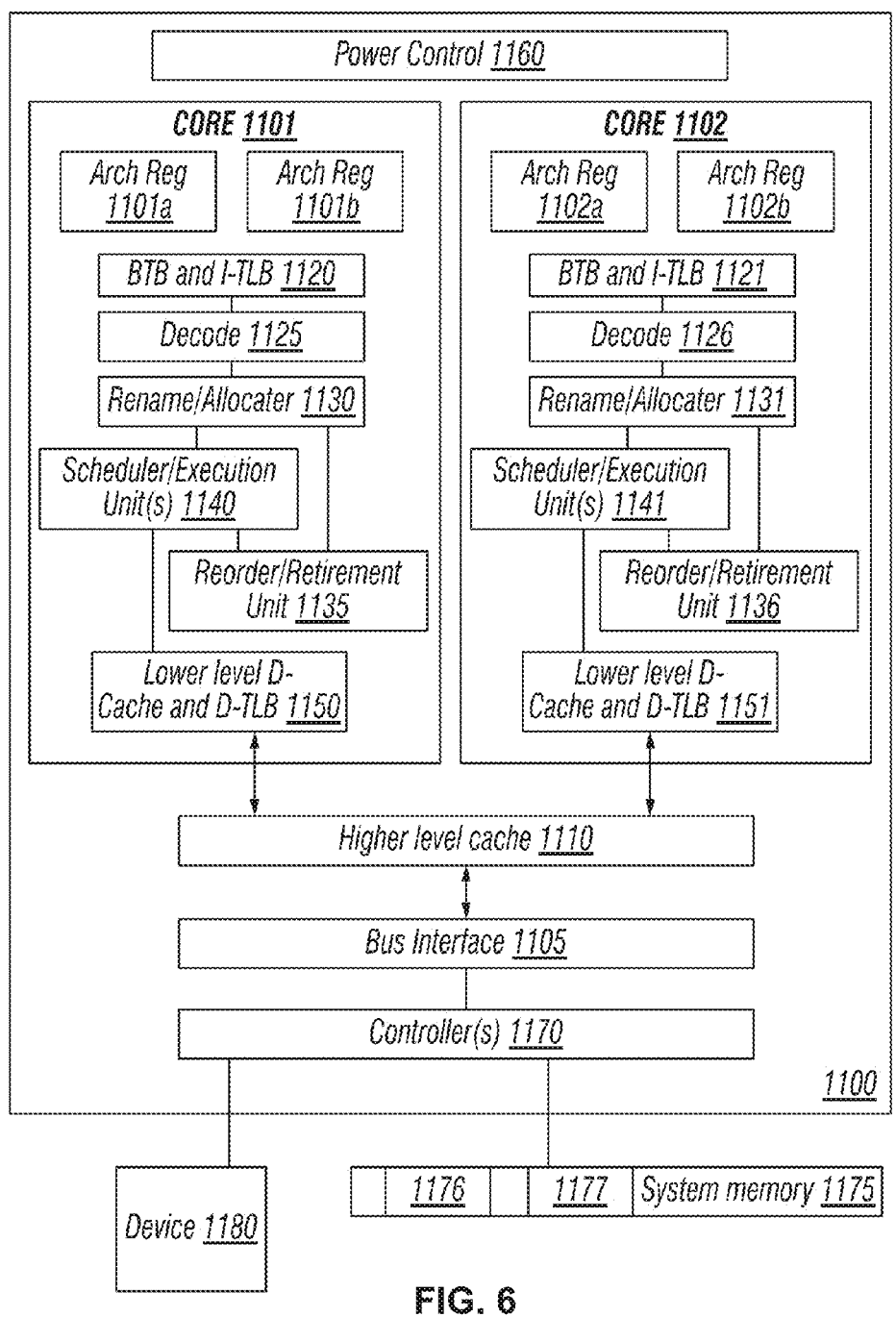
FIG. 6 is a block diagram of a processor including multiple cores in accordance with an embodiment of the present invention.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
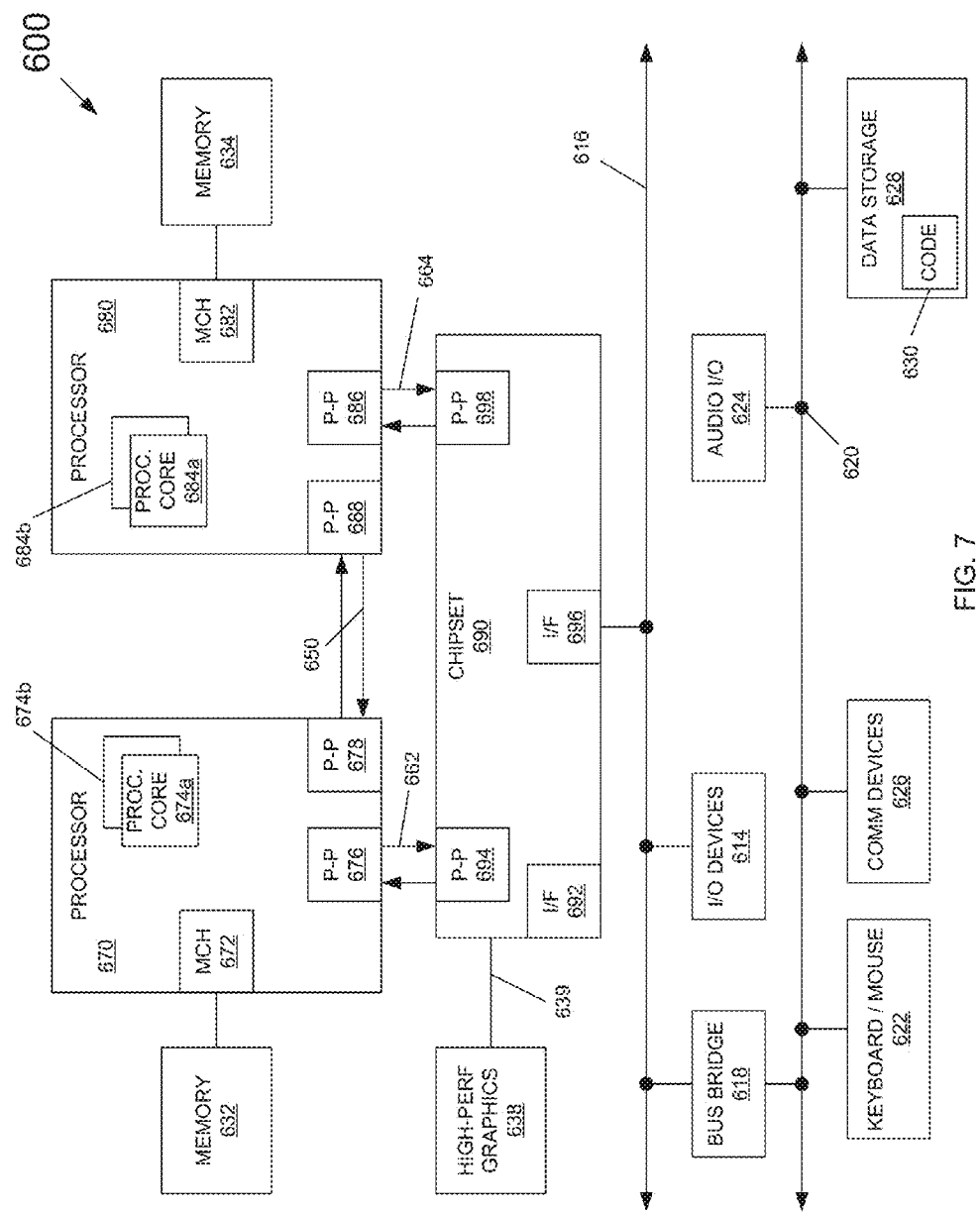
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors. Each of the processors can include multiple levels of a cache hierarchy configured to perform limited prefetching, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment.

Further, an audio I/O 624 may be coupled to second bus 620. Embodiments can be incorporated into other types of systems including mobile devices such as a smart cellular telephone, tablet computer, netbook, Ultrabook™, or so forth.

Figure 8:
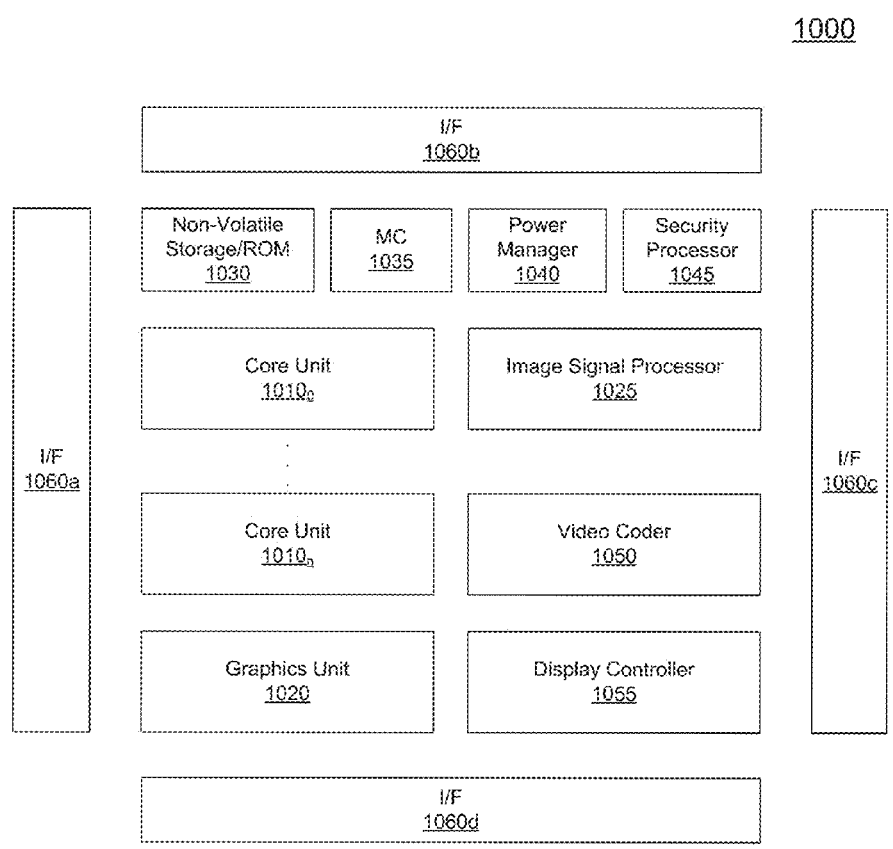
FIG. 8 is a block diagram of a processor in accordance with another embodiment of the present invention.

Referring now to FIG. 8, shown is a block diagram of a processor in accordance with another embodiment of the present invention. In the embodiment of FIG. 8, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 8, processor 1000 includes a plurality of core units $1010_0$-$1010_n$. Each core unit may include one or more processor cores, one or more cache memories and other circuitry. The cache memories may be configured to generate and handle limited prefetching requests as described herein. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory also configured to perform limited prefetching as described herein. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 8).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 8, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth. Each of the units may have its power consumption controlled via a power manager 1040. Power manager 1040 includes control logic to adaptively enable the limited prefetching described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 8, understand the scope of the present invention is not limited in this regard.

The following examples pertain to further embodiments.

In one example, a processor comprises at least one core including one or more execution units, a first cache memory and a first cache control logic, where the first cache control logic is to generate a first prefetch request to prefetch first data, and where the first prefetch request is to be aborted if the first data is not present in a second cache memory coupled to the first cache memory. The first data may be promoted to the first cache memory if present in the second cache memory.

In an example, the first cache control logic is to further generate a second prefetch request to prefetch second data, where the second prefetch request is to be issued to a memory coupled to the processor if the first data is not present in a cache memory hierarchy of the processor. The first prefetch request may be a limited prefetch request, and the second cache memory includes a second cache control logic to abort the first prefetch request if the first data is not present in the second cache memory.

In an example, the second cache control logic is to issue a third prefetch request to a third cache memory coupled to the second cache memory if the second data is not present in the second cache memory. And, the second cache control logic may generate the third prefetch request to request third data from the third cache memory based at least in part on the cache miss for the second data.

In an example, the first cache control logic is to generate the first prefetch request responsive to a cache miss in the first cache memory for a requested data. The first cache control logic may generate the first prefetch request for the first data based at least in part on an address of the requested data. As an example, the first prefetch request comprises one of a next line prefetch and a streaming prefetch. Note that the first data may have been subject to a prior demand request received by the first cache control logic. And, the first cache control logic may generate the first prefetch request when a result of a first calculation is less than a threshold level.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method comprises: generating, in a first cache controller associated with a first cache memory of a cache memory hierarchy of a processor, a limited prefetch request to request first data; determining if the first data is present in a second cache memory of the cache memory hierarchy; and if so, promoting the first data to the first cache memory, and otherwise constraining the limited prefetch request to the processor. Constraining the limited prefetch request may include sending the limited prefetch request to a next level cache memory of the cache hierarchy, but not issuing the limited prefetch request to a memory coupled to the processor (regardless of whether the requested data is or is not present in the cache hierarchy), in an example.

In an example, the method further comprises generating the limited prefetch request responsive to a cache miss for a second data.

In an example, the method further comprises: generating the limited prefetch request in a first prefetcher and generating a second prefetch request in a second prefetcher, where the second prefetch request is for second data; and sending the second prefetch request to a memory coupled to the processor, if the second data is not present in the cache memory hierarchy.

In an example, the method further comprises concurrently generating a second limited prefetch request in a second cache controller of the second cache memory concurrently with generating the limited prefetch request in the first cache controller. Note that the limited prefetch request may be for a plurality of cache lines.

In an example, the method further comprises executing an instruction in a core of the processor using the first data with a reduced latency by promoting the first data to the first cache memory responsive to the limited prefetch request.

In another example, a computer readable medium and/or a machine-readable medium including instructions is to perform the method of any of the above examples.

In another example, an apparatus comprises means for performing the method of any one of the above examples.

In another example, a system comprises: a processor including a first core having a first cache memory and a second cache memory, and a first prefetcher associated with the first cache memory to issue a first prefetch request for first data to a memory hierarchy and to issue a second prefetch request for second data to the second cache memory, where the second cache memory is to provide the second data to the first cache memory if present therein, and otherwise to abort the second prefetch request; and a memory coupled to the processor, where the memory is part of the memory hierarchy and comprises a dynamic random access memory (DRAM).

In an example, the second cache memory is to issue the first prefetch request to a third cache memory coupled to the second cache memory if the first data is not present in the second cache memory. In turn, the third cache memory may issue the first prefetch request to the memory if the first data is not present in the third cache memory.

In an example, the first core may execute an instruction using the second data with a first latency when the second data is provided by the second cache memory responsive to the second prefetch request, and the first core may execute the instruction using the second data with a second latency when the second cache memory aborts the second prefetch request, where the first latency is less than the second latency.

Understand that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one core including one or more execution units, a first cache memory and a first cache control logic, wherein the first cache control logic is to generate a first prefetch request to prefetch first data, wherein the first prefetch request is to be aborted if the first data is not present in a second cache memory coupled to the first cache memory, based on a first indicator of the first prefetch request to indicate that the first prefetch request is to be handled in a single level of a cache memory hierarchy.

2. The processor of claim 1, wherein the first data is to be promoted to the first cache memory if present in the second cache memory.

3. The processor of claim 1, wherein the first cache control logic is to further generate a second prefetch request to prefetch second data, wherein the second prefetch request is to be issued to a memory coupled to the processor if the first data is not present in the cache memory hierarchy of the processor, based on a second indicator of the second prefetch request to indicate that the second prefetch request is to be handled in multiple levels of the cache memory hierarchy.

4. The processor of claim 3, wherein the first prefetch request comprises a limited prefetch request, and wherein the second cache memory includes a second cache control logic to abort the first prefetch request if the first data is not present in the second cache memory, based on the first indicator.

5. The processor of claim 4, wherein the second cache control logic is to issue a third prefetch request to a third cache memory coupled to the second cache memory if the second data is not present in the second cache memory.

6. The processor of claim 5, wherein the second cache control logic is to generate the third prefetch request to request third data from the third cache memory based at least in part on the cache miss for the second data.

7. The processor of claim 1, wherein the first cache control logic is to generate the first prefetch request responsive to a cache miss in the first cache memory for a requested data.

8. The processor of claim 7, wherein the first cache control logic is to generate the first prefetch request for the first data based at least in part on an address of the requested data.

9. The processor of claim 1, wherein the first data was subject to a prior demand request received by the first cache control logic.

10. The processor of claim 1, wherein the first cache control logic is to generate the first prefetch request having the first indicator when a result of a first calculation is less than a threshold level corresponding to a confidence metric regarding utility of the first data.

11. A machine-readable medium having stored thereon instructions, which if performed by a machine cause the machine to perform a method comprising:
   generating, in a first cache controller associated with a first cache memory of a cache memory hierarchy of a processor, a limited prefetch request to request first data, based on comparison of a result of a calculation to generate the limited prefetch request to a confidence metric;
   determining if the first data is present in a second cache memory of the cache memory hierarchy; and
   if so, promoting the first data to the first cache memory, and otherwise constraining the limited prefetch request to the processor.

12. The machine-readable medium of claim 11, wherein constraining the limited prefetch request comprises sending the limited prefetch request to a next level cache memory of the cache hierarchy, but not issuing the limited prefetch request to a memory coupled to the processor.

13. The machine-readable medium of claim 11, wherein the method further comprises generating the limited prefetch request responsive to a cache miss for a second data.

14. The machine-readable medium of claim 11, wherein the method further comprises:
   generating the limited prefetch request in a first prefetcher and generating a second prefetch request in a second prefetcher, wherein the second prefetch request is for second data; and
   sending the second prefetch request to a memory coupled to the processor, if the second data is not present in the cache memory hierarchy.

15. The machine-readable medium of claim 11, wherein the method further comprises concurrently generating a second limited prefetch request in a second cache controller of the second cache memory concurrently with generating the limited prefetch request in the first cache controller.

16. The machine-readable medium of claim 11, wherein the method further comprises executing an instruction in a core of the processor using the first data with a reduced latency by promoting the first data to the first cache memory responsive to the limited prefetch request.

17. A system comprising:
   a processor including a first core having a first cache memory and a second cache memory, and a first prefetcher associated with the first cache memory to issue a first prefetch request for first data to a memory hierarchy, the first prefetch request having a second indicator having a first state to identify a first prefetch type, and to issue a second prefetch request for second data to the second cache memory, the second prefetch request having a second indicator having a second state to identify a second prefetch type, wherein the second cache memory is to provide the second data to the first cache memory if present therein, and otherwise to abort the second prefetch request, based on the second indicator having the second state; and
   a memory coupled to the processor, the memory part of the memory hierarchy and comprising a dynamic random access memory (DRAM).

18. The system of claim 17, wherein the second cache memory is to issue the first prefetch request to a third cache memory coupled to the second cache memory if the first data is not present in the second cache memory.

19. The system of claim 18, wherein the third cache memory is to issue the first prefetch request to the memory if the first data is not present in the third cache memory.

20. The system of claim 17, wherein the first core is to execute an instruction using the second data with a first latency when the second data is provided by the second cache memory responsive to the second prefetch request, and to execute the instruction using the second data with a second latency when the second cache memory aborts the second prefetch request, the first latency less than the second latency.

21. The processor of claim 1, wherein the first prefetch request comprises a defeasible prefetch request.

22. The processor of claim 3, wherein the first prefetch request comprises a field including the first indicator having a first state to indicate that the first prefetch request is to be handled in the single level of the cache memory hierarchy and a second indicator having a second state to indicate that the first prefetch request is not a demand request.

* * * * *